US011354888B2

(12) United States Patent
Wang et al.

(10) Patent No.: US 11,354,888 B2
(45) Date of Patent: Jun. 7, 2022

(54) METHOD AND APPARATUS FOR A NEURAL NETWORK

(71) Applicant: GM Global Technology Operations LLC, Detroit, MI (US)

(72) Inventors: Shige Wang, Northville, MI (US); Wei Tong, Troy, MI (US); Shuqing Zeng, Sterling Heights, MI (US); Roman L. Millett, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 874 days.

(21) Appl. No.: 16/193,303

(22) Filed: Nov. 16, 2018

(65) Prior Publication Data
US 2020/0160125 A1   May 21, 2020

(51) Int. Cl.
| | |
|---|---|
| *G06V 10/70* | (2022.01) |
| *G06F 9/30* | (2018.01) |
| *G06N 3/04* | (2006.01) |
| *G06F 3/06* | (2006.01) |
| *G06N 3/08* | (2006.01) |
| *G05D 1/02* | (2020.01) |

(52) U.S. Cl.
CPC .......... *G06V 10/768* (2022.01); *G06F 3/0604* (2013.01); *G06F 3/0631* (2013.01); *G06F 3/0673* (2013.01); *G06F 9/30* (2013.01); *G06N 3/04* (2013.01); *G06N 3/08* (2013.01); *G05D 1/0246* (2013.01)

(58) Field of Classification Search
CPC combination set(s) only.
See application file for complete search history.

(56) References Cited

U.S. PATENT DOCUMENTS

| 10,614,148 | B2 * | 4/2020 | Balasubramaniyan ... G06T 5/10 |
| 2015/0286766 | A1 | 10/2015 | Singh et al. |
| 2016/0379115 | A1 | 12/2016 | Burger et al. |
| 2017/0024644 | A1 | 1/2017 | Van Der Made et al. |
| 2017/0103298 | A1 | 4/2017 | Ling et al. |

(Continued)

OTHER PUBLICATIONS

Du, Z., Fasthuber, R., Chen, T., Ienne, P., Li, L., Luo, T., . . . & Temam, O. (Jun. 2015). ShiDianNao: Shifting vision processing closer to the sensor. In Proceedings of the 42nd Annual International Symposium on Computer Architecture (pp. 92-104). (Year: 2015).*

(Continued)

*Primary Examiner* — David Perlman
(74) *Attorney, Agent, or Firm* — Quinn IP Law (57) ABSTRACT

A signal processing system includes a central processing unit (CPU) in communication with an accelerator, and an instruction scheduler in communication with the accelerator. A first memory device including a first instruction set is configured to operate the accelerator, a second instruction set is configured to operate the CPU, and a second memory device is configured to receive a datafile. The accelerator includes a plurality of processing engines (PEs) and an instruction scheduler, the instruction set includes a plurality of operators, and the instruction scheduler is configured to implement the operators in the accelerator employing the PEs. The CPU employs the operators implemented in the accelerator to analyze the datafile to extract a feature therefrom.

19 Claims, 8 Drawing Sheets

(56) References Cited

U.S. PATENT DOCUMENTS

| | | |
|---|---|---|
| 2017/0103299 A1 | 4/2017 | Aydonat et al. |
| 2017/0277462 A1 | 9/2017 | Zhang et al. |
| 2017/0357891 A1 | 12/2017 | Judd et al. |
| 2018/0032857 A1 | 2/2018 | Lele et al. |
| 2018/0032859 A1* | 2/2018 | Park .................. G06N 3/04 |
| 2018/0039886 A1 | 2/2018 | Umuroglu et al. |
| 2018/0121796 A1 | 5/2018 | Deisher et al. |
| 2018/0189229 A1 | 7/2018 | Desoli et al. |
| 2018/0204111 A1 | 7/2018 | Zadeh et al. |
| 2018/0336425 A1* | 11/2018 | Kadav .............. G06N 3/0445 |

OTHER PUBLICATIONS

Wei, X., Liang, Y., Li, X., Yu, C. H., Zhang, P., & Cong, J. (Nov. 2018). TGPA: tile-grained pipeline architecture for low latency CNN inference. In Proceedings of the International Conference on Computer-Aided Design (pp. 1-8). (Year: 2018).*

* cited by examiner

METHOD AND APPARATUS FOR A NEURAL NETWORK

INTRODUCTION

An artificial neural network is a computational framework that employs multiple machine learning algorithms to work together to process complex datafiles, e.g., visual images, audio files, etc. Processor configurations to implement artificial neural networks may have suboptimal performance. Performance of a computer or processor can be evaluated in terms of an instruction execution rate or throughput, which may be expressed in millions of instructions per second (MIPS), clock speed, bus size, resource utilization, memory size, latencies, bandwidth, throughput, etc.

An artificial neural network includes an input layer, one or more hidden layers and an output layer. Some embodiments of hardware that can be configured to execute a neural network may define a fixed configuration for each layer. Such an arrangement can be sub-optimal because layers may have different parallelisms that may be best served with different performance engines (PEs). Over-provision of PEs may result in increased cost, reduced reliability, and excess power consumption.

Hardware configurations for implementing neural networks may include a central processing unit (CPU) that operates in conjunction with an accelerator to process image files or other data that is captured on a memory device. An accelerator may utilize specialized hardware in the form of general purpose computing on graphics processing units (GPGPUs), multi-core processors, field programmable gate arrays (FPGAs), and application specific integrated circuits (ASICs).

One embodiment of a neural network is a convolutional neural network (CNN), which has been shown to be an effective tool for performing image recognition, detection, and retrieval. CNNs may be scaled up and configured to support large labeled datasets that are required for the learning process. Under these conditions, CNNs have been found to be successful in learning complex and robust image features. A CNN is a type of feed-forward artificial neural network where individual neurons are tiled in a manner such that they respond to overlapping regions in a visual field.

SUMMARY

A signal processing system is disclosed and includes a central processing unit (CPU) in communication with an accelerator, and an instruction scheduler in communication with the accelerator. A first memory device including a first instruction set is configured to operate the accelerator and a second instruction set configured to operate the CPU, and a second memory device is configured to receive a datafile. The accelerator includes a plurality of processing engines (PEs) and an instruction scheduler, the instruction set includes a plurality of operators, and the instruction scheduler is configured to implement the operators in the accelerator employing the PEs. The CPU employs the operators implemented in the accelerator to analyze the datafile to extract a feature therefrom.

An aspect of the disclosure includes the datafile being a bitmap image file of a field of view that is captured by a camera, wherein the CPU employs the accelerator to extract the feature from the bitmap image file.

Another aspect of the disclosure includes the signal processing system being in communication with a control system that is disposed to execute a control action, wherein the control system is disposed to execute the control action based upon the feature that is extracted from the bitmap image file.

Another aspect of the disclosure includes the operators including a composable rectified linear (ReLU) operator that is implemented by one of the PEs.

Another aspect of the disclosure includes the operators including a composable pooling operator that is implemented by one of the PEs.

Another aspect of the disclosure includes the composable pooling operator being a maximum pooling operator.

Another aspect of the disclosure includes the composable pooling operator being an average pooling operator.

Another aspect of the disclosure includes the instruction scheduler being configured to implement the operators in the accelerator employing the PEs, including being configured to implement a single one of the PEs to process a single kernel of data that is applied to a single input feature to achieve a single output feature.

Another aspect of the disclosure includes the instruction scheduler being configured to implement a plurality of duplicate ones of the PEs arranged in parallel to process tiles of the kernels of data.

Another aspect of the disclosure includes the instruction scheduler being configured to implement a plurality of a plurality of duplicate ones of the PEs arranged in parallel to process a plurality of tiles of the kernels of data.

Another aspect of the disclosure includes the operator implemented in the accelerator being a composable rectified linear (ReLU) operator.

Another aspect of the disclosure includes a first merger arrangement including a processing unit that processes a single tile of data to effect a convolution operation in series with a ReLU operator.

Another aspect of the disclosure includes the operator implemented in the accelerator being a second merger arrangement including a processing unit that processes multiple tiles of data to effect a convolution operation disposed in series with a processing engine that is configured to effect a pooling operation.

Another aspect of the disclosure includes a third merger arrangement including a first processing unit being configured to process multiple tiles of data to effect a convolution operation arranged in series with a second processing unit configured to process multiple tiles of data to effect a convolution operation, including an intervening data buffer.

Another aspect of the disclosure includes a vehicle control system for a vehicle, including a camera disposed to capture a field of view proximate thereto, a control system configured to control operation of an actuator of the vehicle, and a signal processing system including a controller, an accelerator and a memory device, wherein the accelerator includes a plurality of processing engines (PEs). The signal processing system is in communication with the camera and the control system. The controller includes an instruction set. The controller is operable to capture, via the camera, an image of the field of view, wherein the image is composed of a bitmap image file. The bitmap image file is communicated to the memory device, and the accelerator implements a plurality of operators, wherein the plurality of operators originate from the instruction set. The controller executes the plurality of operators to extract a feature from the bitmap image file, and the control system controls operation of the actuator of the vehicle based upon the feature extracted from the bitmap image file.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically shows data inputs in the form of three bitmap image files and associated filters, wherein each of the bitmap image files is composed as a plurality of pixels arranged in an x-y matrix, in accordance with the disclosure;

FIG. 3-2 schematically illustrates a process for feature detection via a processing unit that employs a single processing engine to process a single kernel of data (PE-K unit) employing a K×K-sized filter that is applied to a single input feature (IF) for each pixel of the bitmap image file of FIG. 3-1 to achieve a single output feature (OF), in accordance with the disclosure;

FIG. 3-3 schematically illustrates a non-limiting embodiment of a process for feature detection via a processing unit that processes tiles of data containing m×m kernels of data (PE-T unit), wherein the PE-T unit is composed of a quantity of m duplicates of the PE-K units, in accordance with the disclosure;

FIG. 3-4 schematically illustrates a non-limiting embodiment of a process for feature detection via a processing unit that processes multiple tiles of data, each tile containing m quantity of k×k kernels of data (PE-W unit), wherein the PE-W unit is composed of a quantity of n duplicates of PE-T units, in accordance with the disclosure;

FIG. 4-1 schematically illustrates a first configuration wherein the input memory includes a first kernel having a 3×3 pixel dimension, in accordance with the disclosure;

FIG. 4-2 schematically illustrates a second configuration wherein the input memory includes a second kernel having a 4×4 pixel dimension, in accordance with the disclosure;

FIG. 4-3 schematically illustrates a third configuration wherein the input memory includes a third kernel having a 5×5 pixel dimension, in accordance with the disclosure;

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
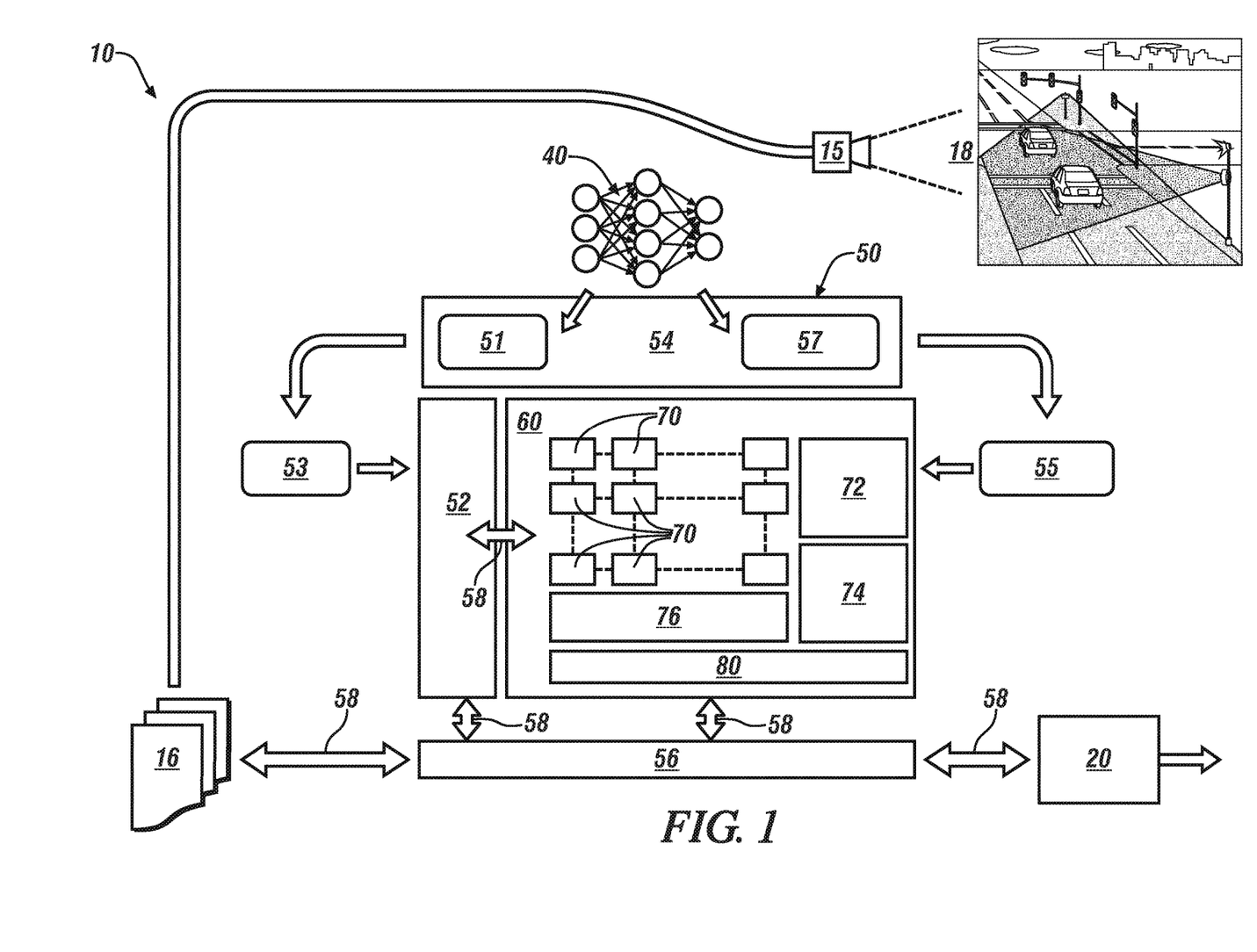
FIG. 1 schematically illustrates a signal processing system including a central processing unit (CPU) and an accelerator that are configured to execute an artificial neural network, wherein the signal processing system is an element of a vehicle control system that includes a sensing system and a control system, in accordance with the disclosure.

Referring now to the drawings, wherein the depictions are for the purpose of illustrating certain exemplary embodiments only and not for the purpose of limiting the same, FIG. 1 schematically illustrates a signal processing system 50 including a central processing unit (CPU) 52 and an accelerator 60 that are configured to execute an artificial neural network 40, wherein the signal processing system 50 is an element of a vehicle control system 10 that includes a sensing system 15 and a vehicle controller 20. The sensing system 15 captures data, which may be communicated to the signal processing system 50. The signal processing system 50 may be configured to extract a feature from the captured data, and communicate the feature to the vehicle controller 20, which may be configured to execute a control action based thereon.

In one embodiment, and as described herein, the vehicle control system 10, sensing system 15, signal processing system 50, and vehicle controller 20 are disposed on a vehicle. In one embodiment, the vehicle controller 20 includes an autonomous control system, including, e.g., one or a plurality of actuators for an adaptive cruise control system, an autonomous steering control system, an autonomous braking control system, etc. In one embodiment, the sensing system 15 may be a digital camera that dynamically captures a bitmap image file 16 of a field of view 18 of the digital camera. In one embodiment, the signal processing system 50 may be configured to dynamically process signal files to extract one or more features from the bitmap image file 16 of the field of view 18 of the digital camera, which can include detecting an obstruction in a travel path of the vehicle. In one embodiment, the vehicle controller 20 may be configured to execute a control action in response to the extracted feature, e.g., implement autonomous braking control, autonomous speed control or autonomous steering control based upon the detected obstruction in the travel path of the vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. It is appreciated that the specific implementation described hereinabove is a non-limiting illustration of one embodiment. The concepts described herein apply to various embodiments of the signal processing system 50 as described herein.

The signal processing system 50 includes the CPU 52, a first memory device 54, a random-access memory (RAM) device, e.g., a dynamic RAM (DRAM) device 56, and the accelerator 60, all of which interconnect and communicate via a communication bus 58.

The first memory device 54 includes algorithmic code in the form of a first set of instructions 51, a portion of which may be accessed as a CPU instruction set 53 to control operation of the CPU 52.

The first memory device 54 also includes algorithmic code in the form of a second set of instructions 57, all or a portion of which is in the form of an accelerator instruction set 55 that may be accessed to dynamically control configuration of the accelerator 60.

The CPU 52 and the accelerator 60 execute their respective CPU and accelerator instruction sets 53, 55, respectively, to extract a feature from the bitmap image file 16, which can be communicated to the vehicle controller 20.

In one embodiment, the accelerator 60 is configured as a multi-layer array that is composed of a plurality of processing engines (PEs) 70 that are arranged to effect fast dense matrix-matrix operation and matrix-vector operation.

The accelerator 60 may be configured as a graphics processing unit (GPU), a field-programmable gate array (FPGA), a digital signal processor (DSP) or another integrated circuit that is configured to support high-speed, repetitive, numerically intensive data processing tasks.

The accelerator 60 includes the array of PEs 70, an instruction set fetcher 72, an instruction scheduler 74, a global memory buffer 76, and a plurality of data caches 78.

The accelerator instruction set 57 includes the accelerator instruction set 55 that is employed to dynamically configure the accelerator 60.

Advantageously, the accelerator instruction set 57 and the instruction scheduler 74 configure the PEs of the accelerator 60 to match computation demands. Frequently-used operators are configured in uniformed format, with operators implemented in flexible configuration of hardware. There are mechanisms to merge layers to reduce data transfer, with the instruction scheduler 74 operating to fill the input and manage the activation of instructions.

Each bitmap image file 16 is stored in the DRAM 56.

The CPU 52 executes the CPU instruction set 53 including employing the accelerator 60 to process data in the form of a subset of data from the bitmap image file 16 that is stored in the DRAM 56 to extract one or more features.

The artificial neural network 40 contains multiple layers that can be executed as stages on the accelerator 60. Each image is being processed only once at each stage. The structure of the artificial neural network 40 for an application is fixed in this embodiment.

However, depending on the structure of the artificial neural network 40, the accelerator 60 may be reconfigured with different layer combinations. For example, if example layer L is a convolution operation (cony) followed by a layer L+1 having a ReLU operation, it will wire PE_W with a PE_R. If layer L is a convolution operation (conv) followed by layer L+1 also being a convolution operation (conv), it will wire PE_W to PE_W to form a super-layer (PE_S).

A set of operators are defined to support dynamic reconfiguration of the processing engines (PE) based on the computation of the different layers in the artificial neural network 40 when trained. The operators can be implemented as a set of instructions on hardware (FPGA, DSP and/or ASIC) to achieve high performance and low-power consumption.

Reconfiguration involves only the number of active units in the computation, which can be achieved by feeding data in the port to activate the corresponding units. For PE_W/PE_K, reconfiguring can be avoided.

When the instruction set includes a convolutional neural network (CNN) operation, the instruction set can include as follows. An example of a portion of an instruction set that is implementable as hardware in the accelerator 60 is illustrated with reference to FIG. 2. A convolution code set may be as follows in Table 1.

TABLE 1

Figure 2:
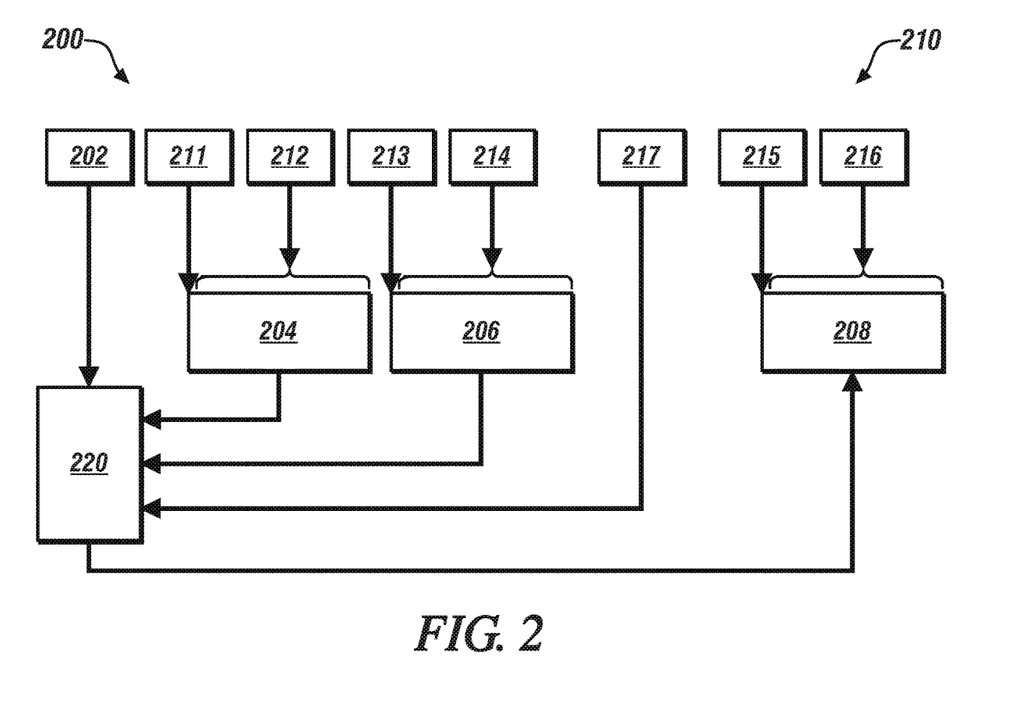
FIG. 2 schematically illustrates a portion of an instruction set that is implementable in an accelerator employing a single processing engine (PE), in accordance with the disclosure.

Program: conv(&input, i_size, &kernel, k_size, &output, o_size, stride)
instruction:    ld reg1, input_add;
           ld reg2, i_size;
          ld reg3, kernel_add;
          ld reg4, k_size;
          ld reg5, output_add;
          ld reg6, o_size;
          ld reg7, stride
          conv reg1, reg2, reg3, reg4, reg5, reg6, reg7

The convolution code set of Table 1 may be implemented in the accelerator 60 as operation 200, which is shown with reference to FIG. 2, which includes a single PE 220, a convolution instruction 202, and a plurality of data registers 210 that are indicated as follows: reg1 211, reg2 212, reg3 213, reg4 214, reg5 215, reg6 216, and reg7 217. The PE 220 is provided a convolution instruction (cony) 202 to act upon an input memory 204 and a kernel memory 206 taking into consideration a stride, which is contained in reg7 217. The input memory 204 is obtained from reg1 211 and reg2 212, and the kernel memory 206 is obtained from reg3 213 and reg4 214. The contents of the memory data in reg1 211 and reg2 212 originate from the bitmap image file 16. The PE 220 generates an output memory 208 as a result of the convolution process, which is transferred to reg5 215 and reg6 216. The hardware may be a DSP element, an ALU (arithmetic logic unit) element, or a LUT (lookup table)

element that is executed on an ASIC (application-specific integrated circuit) chip or FPGA chip.

This concept is described with reference to a convolution (conv) instruction. Other neural network operators that may be implemented in hardware in a similar manner may include deconvolution (deconv), rectified linear (ReLU), averaging (avgpool), and maximum (maxpool) operators.

When implemented in the accelerator 60 as operation 200, the convolution code set shown in Table 1 can be advantageously executed in a single clock cycle of the CPU 52, thus reducing computational effort as compared to a comparable software execution (shown with reference to Table 1), which can involve eight steps and eight associated clock cycles in one embodiment.

Other operators, in addition to convolution that may be employed in CNN operation may include, e.g., max/pooling operators, rectified linear (ReLU) operators, concatenation operators, etc. Each of these operators can be implemented in the accelerator 60 as hardware in a manner that is analogous to that which has been described to accelerate data processing of the bitmap image file 16 for feature extraction.

In order to improve parallelism of the convolution process, data of each bitmap image file is subjected to tiling in order to fit the available resource, with loop unrolling to accomplish data parallelism. To parallelize the execution of the loops, the loops are unrolled and the process is parallelized for a certain number of iterations on hardware. The number of the parallelized iterations on hardware is called the unroll parameter.

Figure 31:
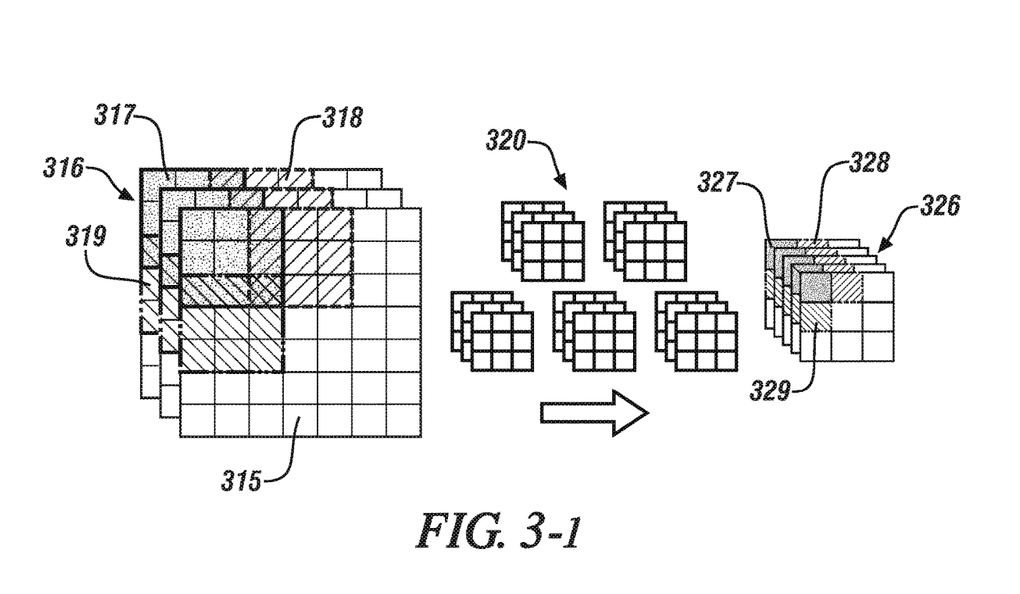

FIG. 3-1 schematically shows data inputs in the form of three bitmap image files 316, with designated portions thereof including a first portion 317, a second portion 318 and a third portion 319 being designated. The first, second and third portions 317, 318 and 319 are also referred to as 'tiles'. The three bitmap image files 316 are subjected to filtering elements 320 to achieve a plurality of filtered bitmap image file portions 326, each including a filtered first portion 327, a filtered second portion 328 and a filtered third portion 329. Each of the bitmap image files 316 is composed of a plurality of pixels arranged in an x-y matrix.

Each of the bitmap image files 316 is an m×m×r image, wherein m represents the height and width of the image and r is the number of channels. Thus an RGB image file has three channels, i.e., r=3. The convolutional layer will have k filters (or kernels) of size n×n×q where n is smaller than the dimension of the image and q can either be the same as the number of channels r or smaller and may vary for each kernel. The size of the filters gives rise to the locally connected structure which are each convolved with the image to produce k feature maps of size m−n+1. Each map is then subsampled with average or max pooling over p×p contiguous regions where p ranges between 2 for small images and is not more than 5 for larger inputs. A CNN includes one or multiple convolutional and subsampling layers that may be followed by fully connected layers.

A single one of the pixels is indicated by element 315. In one embodiment, and as described herein, each of the pixels has associated numeric data, including numeric values indicating an intensity level for each of red, green, and blue (RGB) colors and one or more associated weighting factors.

Figure 32:
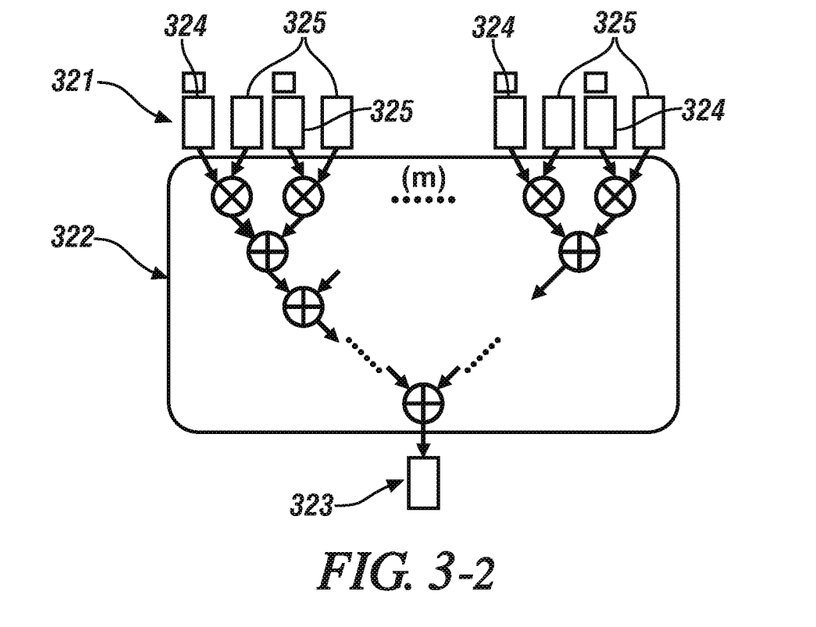

FIG. 3-2 schematically illustrates a process for feature detection via a processing unit that employs a single processing engine (PE) to process a single PE kernel of data (PE-K) 322 employing a K×K filter that is applied to a single input feature (IF) 321 for each pixel of the bitmap image file 316 of FIG. 3-1 to achieve a single output feature (OF) 323.

The size of the K×K filter includes a pixel input 324 and associated weight 325 for the IF 321. Each pixel input 324 of the IF 321 includes a magnitude of the numeric value of one of red, green or blue portion of the respective pixel and each weight 325 is the corresponding weight for the respective pixel. To maximize the quantity of PEs, a minimum of (M*N, total quantity of multiplication addition circuits (MACs) is selected, wherein M relates to the input, and N relates to the output. The PE-K units 322 are employed as building blocks to form PE-tile (PE-T) units 330 to effect a convolution operation, in one embodiment.

Figure 33:
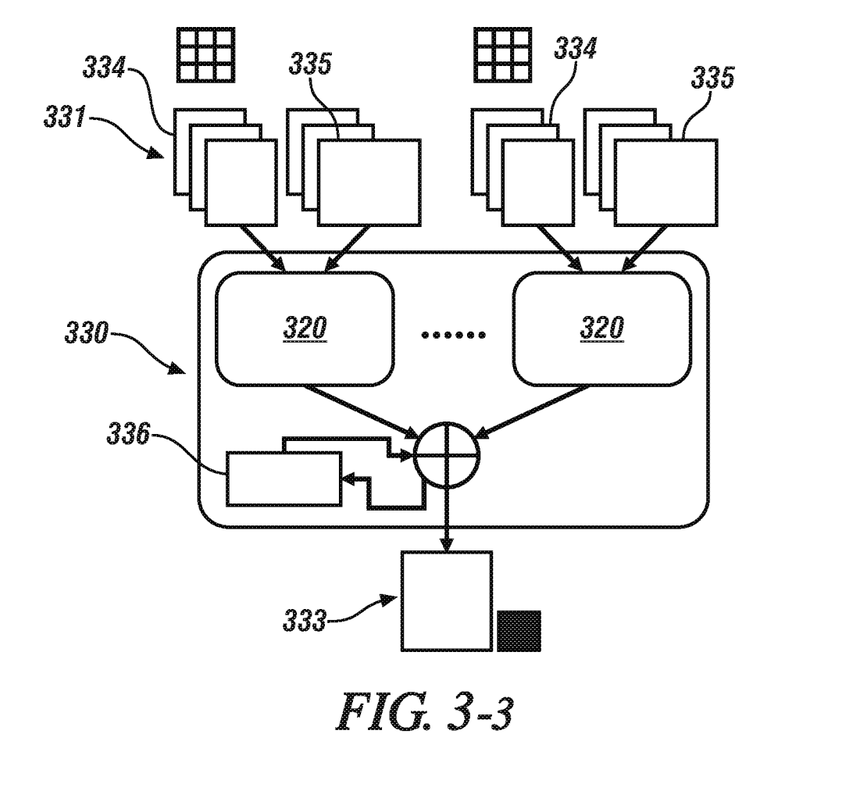

FIG. 3-3 schematically illustrates a non-limiting embodiment of a process for feature detection via the PE-T unit 330. Each PE-T unit 330 is composed of a quantity of m duplicate PE-K units 322 that are employed to parallelize a quantity of M IFs 331 to generate a single OF 333. Each of the IFs 331 are tiles containing a single feature for a subset of the pixels of the bitmap image file of FIG. 3-1. Each of the IFs 331 includes a magnitude of the numeric value of one feature, i.e., an intensity of one of a red, green or blue portion of a respective pixel for an n×n matrix subset of the pixels 334 of the bitmap image file of FIG. 3-1, and corresponding n×n matrix of a subset of the weights 335. The PE-T unit 330 also includes a register 336 that is employed to store intermediate results. When the IF size M 331 is greater than m, the PE-T unit 330 is repeated M/m times.

Figure 34:
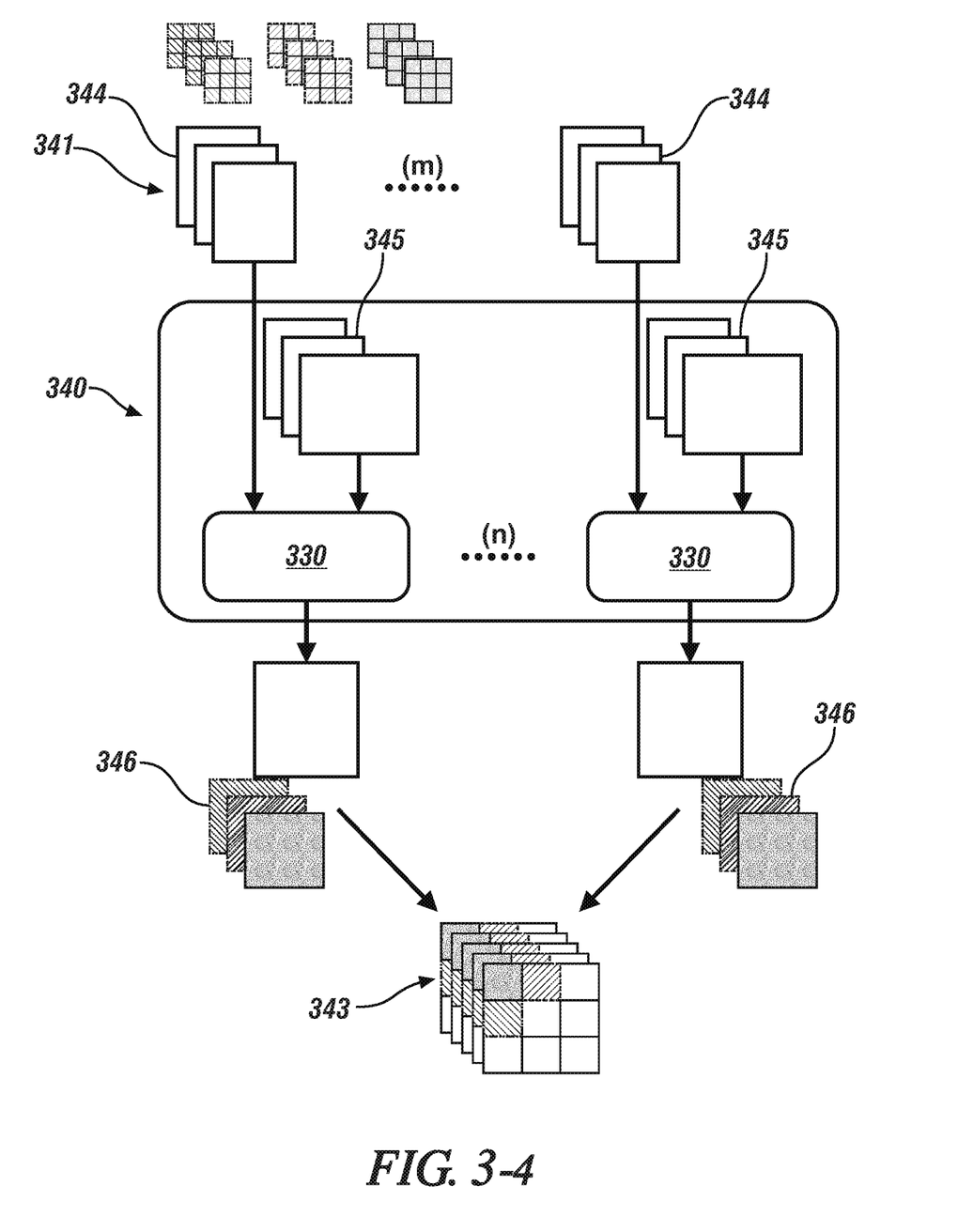

FIG. 3-4 schematically illustrates a non-limiting embodiment of a process for feature detection employing a PE-W unit 340, which is composed of a quantity of n duplicate PE-T units 330. The PE-W unit 340 may be employed to execute convolution operations in one embodiment. The PE-W unit 340 is employed to parallelize a quantity of m IFs 341 and respective weights 345 to generate n quantity of OFs 346. The n quantity of OFs 346 may be stored for further processing. The m and n terms represent scalar values that are determined based upon memory size and data copy overhead.

Figure 41:
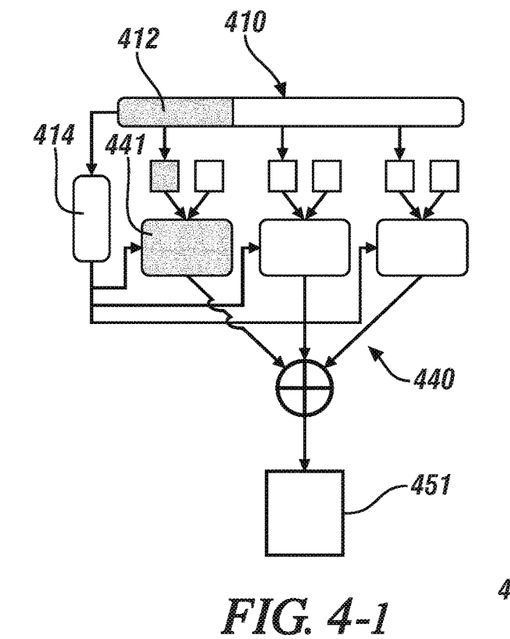
Figure 42:
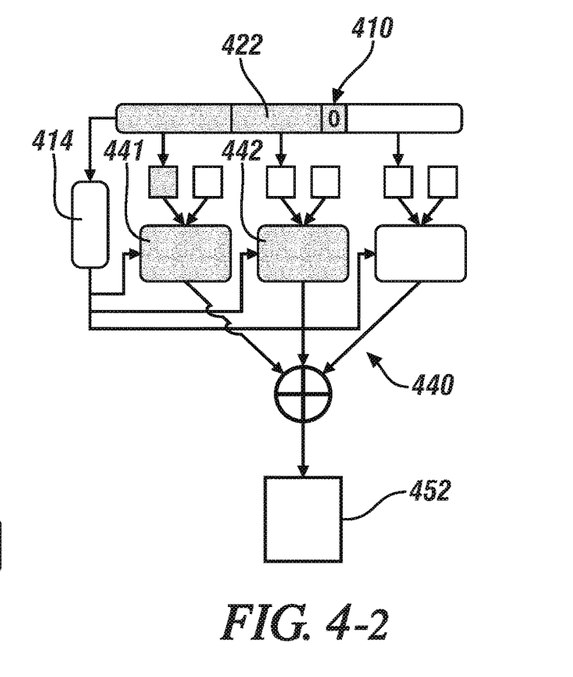
Figure 43:
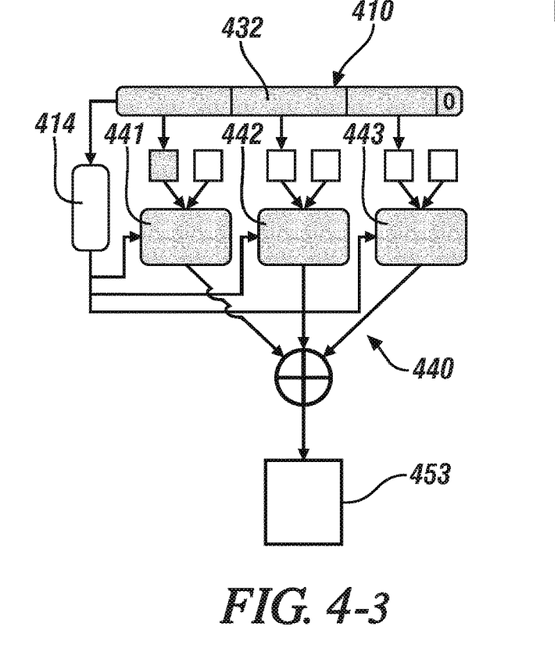

FIGS. 4-1, 4-2 and 4-3 schematically illustrate dynamic reconfiguration, which allows efficient usage of resources when different layers of the accelerator 60 have different sizes and thus have needs for different quantities of PEs. The solution is to generate a configuration that is driven by size of the input kernel k.

A minimum size of kernel k can be determined to implement a lowest granularity PE, designated as mPE_k unit. The quantity of mPE_k units can be calculated based upon the following equation when the maximum size of the filter is Kmax.

$$\left\lceil \frac{K_{max}^2}{k^2} \right\rceil$$

All mPE_k units are connected to a preset range of memory in the memory buffer 76 (shown with reference to FIG. 1) for input.

A selector logic can be added to activate only the mPE_k unit for the input PE_K unit with a larger filter size (K>k), which can be configured by filling a K input memory selector. Thus, given a PE_K unit with a K size filter, input memory IK=K, the operation includes activating a quantity $$\left\lceil \frac{K^2}{k^2} \right\rceil$$

of the mPE_k units to implement the PE_k unit.

The input is filled with 0 values through initialization if K is not a multiple integral of k.

FIG. 4-1 schematically illustrates a first configuration wherein the input memory 410 includes a first kernel 412 having a 3×3 pixel dimension. In this instance, a selector 414 activates only a first PE 441 of the mPE_k units 440 to generate a first resultant 451.

FIG. 4-2 schematically illustrates a second configuration wherein the input memory 410 includes a second kernel 422 having a 4×4 pixel dimension. In this instance, a selector 414 activates the first PE 441 and a second PE 442 of the mPE_k units 440 to generate a second resultant 452.

FIG. 4-3 schematically illustrates a third configuration wherein the input memory 410 includes a third kernel 432 having a 5×5 pixel dimension. In this instance, a selector 414 activates the first PE 441, the second PE 442 and a third PE 443 of the mPE_k units 440. Pre-training the building blocks of a structural CNN helps the training of that CNN to rapidly achieve a desired level of accuracy to generate a third resultant 453.

Figure 5:
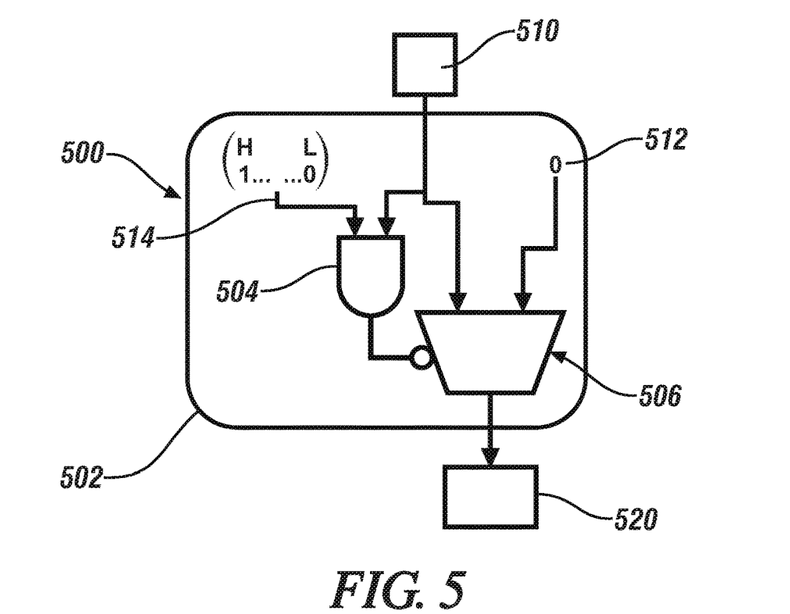
FIG. 5 schematically illustrates a hardware-based processing unit for a composable rectified linear (ReLU) operator, which accelerates execution of ReLU computations by being implemented in hardware, in accordance with the disclosure.

Composability is a system design principle that deals with the inter-relationships of components. A highly composable system provides components that can be selected and assembled in various combinations to satisfy specific user requirements FIG. 5 schematically illustrates a hardware-based processing unit for a composable ReLU operator 500, which accelerates execution of ReLU computations by being implemented in hardware, i.e., in a layer of the accelerator 60, and provides interfaces that are compatible with outputs from other layers. A ReLU operator 500 may be used to apply an element-wise activation function such as max (0,x). The ReLU operator 500 increases non-linear properties of a decision function of an overall CNN without affecting the receptive fields of a convolution layer.

The ReLU operator (PE-R) 500 includes a PE 502 that is composed of an AND gate 504 and a selector gate 506. The ReLU operator 500 generates a signal output o(S) 520.

Inputs to the selector gate 506 include data Input B 510 and numeral 0 512. Inputs to the AND gate 504 include the Input B 510 and a high/low input 514. The selection is driven by a sign bit b of Input B 510. The selector gate 506 logic is as follows:

For B<0, c=1, o(S)=0; and

Figure 6:
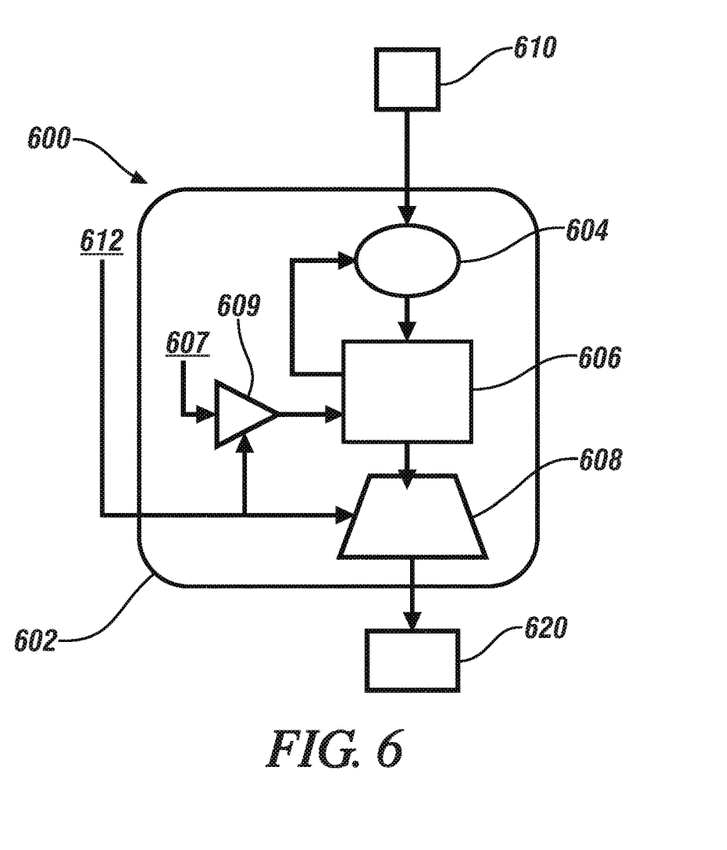
FIG. 6 schematically illustrates a hardware-based processing unit for a composable pooling operator, which accelerates execution of pooling computations, e.g., maxpool, avgpool, by being implemented in hardware, in accordance with the disclosure.

For B>0, c=0, o(S)=B;

FIG. 6 schematically illustrates a hardware-based processing unit for a composable pooling operator 600, which accelerates execution of pooling computations, e.g., maxpool, avgpool, by being implemented in hardware, i.e., in a layer of the accelerator 60, and provides interfaces that are compatible with outputs from other layers. Pooling is employed to calculate a maximum or average value for a feature over a region, e.g., over one of the data tiles 317, 318, 319 of the bitmap image file 316 described with reference to FIG. 3-1.

Pooling operators reduce variance by computing a maximum or average value of a particular feature over a region of an image. This ensures that a consistent result is achieved even when image features have small translation. This operation may be used for object classification and detection.

The pooling operator 600 includes a PE 602 that is composed of an operator 604, a buffer 606, and an enable gate 608. Inputs include Input B 610, and an output enable signal 612, which is determined by size of the pooling kernel. A reset gate 609 has an input 607 that is numeral 0. The operator 604 is a simple operator, e.g., a maximum operator or an average operator. An output enable signal 612 is determined by size of the pooling kernel. The operation includes repetitively inputting data, including Input B 610 to the operator 604 when the output enable signal 612 is low (0), which selects and stores data in the input buffer 606 based thereon. When the output enable signal 612 shifts to high ("1"), the enable gate 608 is activated, transferring the resulting maximum or average value to the output line 620, and controlling the reset gate 609 to clear the buffer 606.

The concepts described with reference to FIGS. 4, 5, and 6 may be employed as building blocks to reduce the quantity of layers, and associated computation reduction to avoid off-chip operations. This includes merging layers by combining convolution with nonlinear and pooling, and generating a super layer by combining multiple convolutions.

Figure 7:
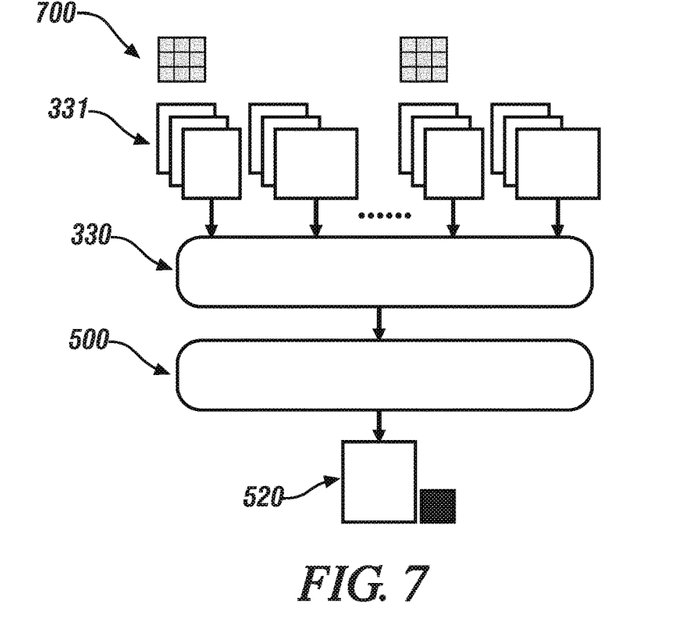
FIG. 7 shows a first merger arrangement that includes arranging an embodiment of the PE-T unit (shown with reference to FIG. 3-3) in series with a ReLU operator (shown with reference to FIG. 5) to effect a convolution operation followed by a ReLU operation to achieve a resultant from inputs, in accordance with the disclosure.

FIG. 7 schematically shows a first merger unit 700 that includes arranging an embodiment of the PE-T unit 330 (shown with reference to FIG. 3-3) in series with a ReLU operator 500 (shown with reference to FIG. 5) to effect a convolution operation followed by a ReLU operation to achieve the resultant 520 from the IFs 331.

Each data point that is output from the convolution operation of the PE-T unit 330 is directly fed into the ReLU operator 500 without need of an intermediate storage device.

Figure 8:
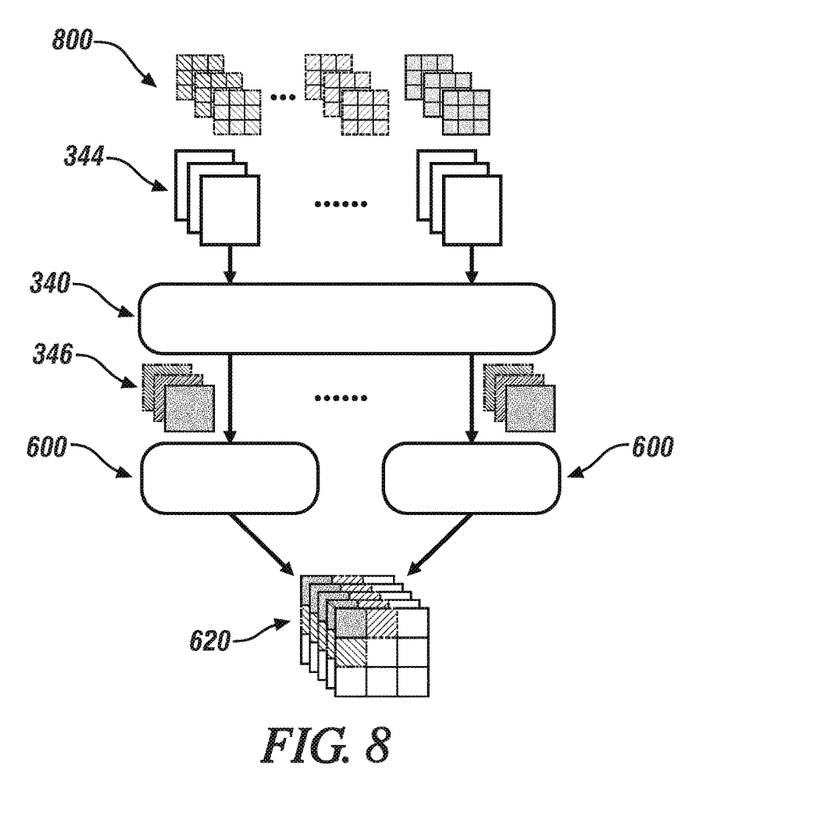
FIG. 8 schematically shows a second merger arrangement that includes arranging an embodiment of the PE-W unit (shown with reference to FIG. 3-4) in series with a PE-P operator (shown with reference to FIG. 6) to effect a convolution operation followed by pooling operations to achieve a resultant from inputs, in accordance with the disclosure.

FIG. 8 schematically shows a second merger unit 800 that includes arranging an embodiment of the PE-W unit 340 (shown with reference to FIG. 3-4) in series with a PE-P operator 600 (shown with reference to FIG. 6) to effect a convolution operation followed by pooling operations to achieve the resultant 620 from inputs 344.

Each data point 346 that is output from the operation of the PE-W unit 340 is directly fed into a respective pooling operator 600 without need of an intermediate storage device.

Figure 9:
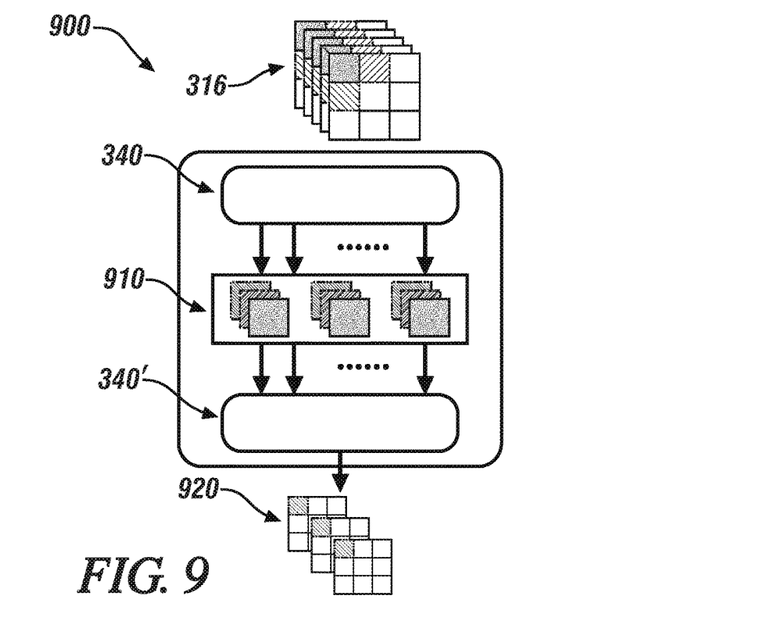
FIG. 9 schematically shows a third merger scheme that includes arranging a first PE-W(i) unit (shown with reference to FIG. 3-4) in series with a second PE-W(i+1) unit (shown with reference to FIG. 3-4), with an intervening data buffer to store intermediate results, in accordance with the disclosure.

FIG. 9 schematically shows a third merger unit 900 that includes arranging a first PE-W(i) unit 340 (shown with reference to FIG. 3-4) in series with a second PE-W(i+1) unit 340' (shown with reference to FIG. 3-4), with an intervening data buffer 910 to store intermediate results.

Data that is output from the first PE-W(i) unit 340 is input to the buffer 910 prior to processing by the second PE-W (i+1) unit 340'.

Figure 10:
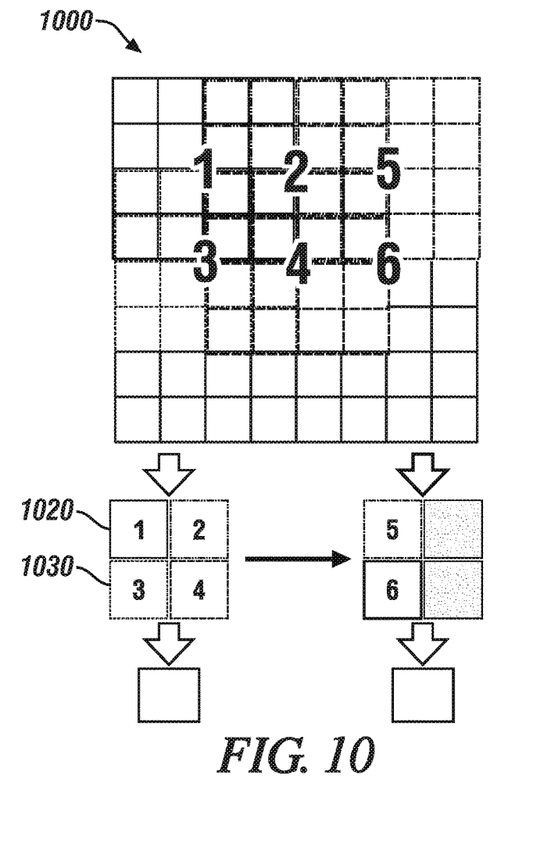
FIG. 10 schematically shows an x-y matrix of pixels of a bitmap image that are separated into overlapping subsets, in accordance with the disclosure.

FIG. 10 schematically shows an x-y matrix of pixels of a bitmap image file 1000 that are separated into overlapping tiles that are subsets of the matrix of pixels. The bitmap image file 1000 is a non-limiting illustration that is provided to describe the concepts herein. The bitmap image file 1000 includes tiles designated by elements 1, 2, 3, 4, 5 and 6. The bitmap image file 1000 is an 8×8 matrix of pixels, and each of the tiles 1, 2, 3, 4, 5 and 6 is a 4×4 matrix of the pixels, wherein each individual tile overlaps the horizontally-adjacent tile and also overlaps the vertically-adjacent tile. In this embodiment, the magnitude of the overlap, or stride, is 2 pixels. Each of the tiles 1, 2, 3, 4, 5 and 6 can be read into corresponding intermediate data buffers 1020, which are 4×4 matrices to generate outputs that are provided to output data buffer 1030. This arrangement facilitates a single transfer of pixel data into the output data buffer 1030 for processing.

Figure 11:
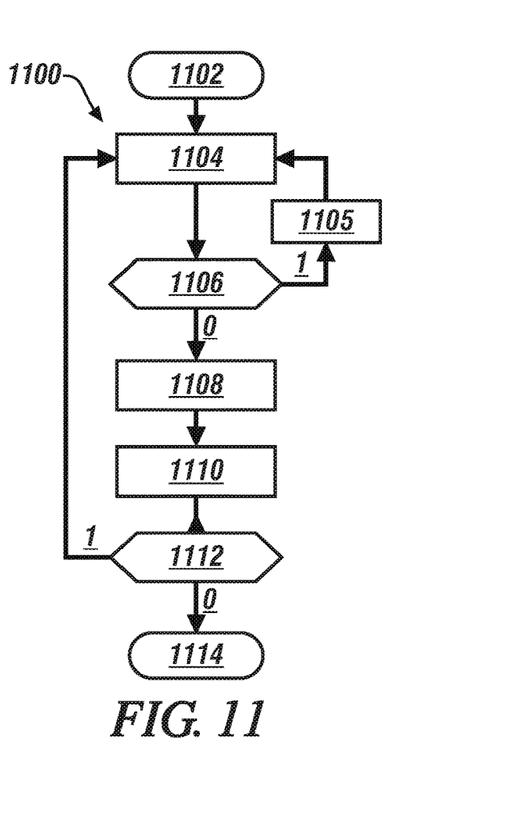
FIG. 11 schematically shows a flowchart for advantageously filling a memory buffer for processing by elements of the signal processing system described herein, in accordance with the disclosure.

FIG. 11 schematically shows an instruction scheduler routine 1100 in the form of a flowchart, which can be executed by the CPU 52 to facilitate initiation of downstream instructions and/or operations, including filling a memory buffer for processing by elements of the signal processing system 50 described hereinabove. Table 2 is provided as a key wherein the numerically labeled blocks and the corresponding functions are set forth as follows, corresponding to the instruction scheduler routine 1100. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
|---|---|
| 1102 | Start |
| 1104 | Fetch instruction |
| 1106 | Combine with previous buffer data? |
| 1105 | Set buffer |
| 1108 | Fill input buffer |
| 1110 | Execute instruction |
| 1112 | More instruction? |
| 1114 | End |

Execution of the instruction scheduler routine 1100 may proceed as follows. The steps of the instruction scheduler routine 1100 may be executed in a suitable order, and are not necessarily limited to the order described with reference to FIG. 11. As employed herein, the term "1" indicates an answer in the affirmative, or "YES", and the term "0" indicates an answer in the negative, or "NO". The routine 1100 initiates (1102), and fetches an instruction (1104), and evaluates whether to combine the new instruction with a previous instruction (1106). If so (1106)(1), the buffer is set (1105), and the next instruction is fetched (1104). If not (1106)(0), the input buffer is filled (1108), and the instruction is executed on the data contained in the buffer (1110). The input buffer is filled (1108) in a preset order, e.g., in an order as is indicated by the tiles 1, 2, 3, 4, 5 and 6 that are depicted in FIG. 10. The routine evaluates the need to execute another instruction (1112), and if so (1112)(1), the process repeats starting at step 1104. If not, (1112)(0), this iteration ends (1114). This operation facilitates initiation of downstream instructions and/or operations, which can be activated by input data that is output from an upstream instruction using a preset local memory region that is defined for input data at time of initialization.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A signal processing system, comprising:
a central processing unit (CPU) in communication with an accelerator;

an instruction scheduler in communication with the accelerator;
a first memory device including a first instruction set configured to operate the accelerator and a second instruction set configured to operate the CPU;
a second memory device configured to receive a datafile; and
the accelerator being a multi-layer array configured to implement a convolution neural network (CNN) according to the first instruction set, the accelerator including a plurality of processing engines (PEs) defined according to PE instructions included within the first instruction set, each of the PEs being configured to implement one of a plurality of operators, the operator associated with each of the PEs being fixed insofar as each PE being incapable of performing any other one of the operators;
wherein the instruction scheduler is configured to selectively implement one or more of the plurality of operators in the accelerator by either one of activating and inactivating each of the PEs associated therewith;
wherein the CPU employs the plurality of operators implemented in the accelerator to analyze the datafile to extract a feature from the datafile;
wherein the CPU communicates the feature to a second controller;
wherein the first memory device includes a third instruction set configured to operate the scheduler, the third instruction set defining a plurality of layers of the CNN configured to analyze the datafile, the third instruction set instructing the scheduler to one of activate and deactivate each of the PEs applicable to each layer such that the PEs are activated and deactivated as needed on a per-layer basis;
wherein the third instruction set defines a kernel size for each of the layers, and wherein the scheduler is configured to activate and deactivate each PE according to the kernel size associated therewith;
wherein the datafile is comprised of a plurality of bitmap images and each layer is configured to analyze a plurality of tiles selected from the bitmap images; and
wherein the scheduler is configured to activate and deactivate each PE on a per-layer basis according to a data size of each tile.

2. The signal processing system of claim 1, wherein the plurality of bitmap images are taken from of a field of view that is captured by a camera.

3. The signal processing system of claim 2, wherein the signal processing system is in communication with a control system that is disposed to execute a control action, and, wherein the control system is disposed to execute the control action based upon the feature that is extracted from the bitmap image file.

4. The signal processing system of claim 1, wherein the plurality of operators comprises a composable rectified linear (ReLU) operator that is implemented by one of the PEs.

5. The signal processing system of claim 1, wherein the plurality of operators comprises a composable pooling operator that is implemented by one of the PEs.

6. The signal processing system of claim 5, wherein the composable pooling operator comprises a maximum pooling operator.

7. The signal processing system of claim 5, wherein the composable pooling operator comprises an average pooling operator.

8. The signal processing system of claim 1, wherein the operator implemented in the accelerator comprises a composable rectified linear (ReLU) operator.

9. The signal processing system of claim 1, wherein the operator implemented in the accelerator comprises a first merger arrangement including a processing unit that processes a single tile of the plurality of tiles to effect a convolution operation in series with a ReLU operator.

10. The signal processing system of claim 1, wherein the operator implemented in the accelerator comprises a second merger arrangement including a processing unit that the plurality of tiles to effect a convolution operation disposed in series with a processing engine that is configured to effect a pooling operation.

11. The signal processing system of claim 1, wherein the operator implemented in the accelerator comprises a third merger arrangement including a first processing unit configured to process the plurality of tiles to effect a convolution operation arranged in series with a second processing unit configured to process the plurality of tiles to effect a convolution operation, including an intervening data buffer.

12. The signal processing system of claim 1 wherein the scheduler is configured to activate at least two PEs for each of the tiles having the data size associated therewith greater than the kernel size of the corresponding layer.

13. A signal processing system for analyzing a field of view of a camera, comprising:
a central processing unit (CPU) in communication with an accelerator;
an instruction scheduler in communication with the accelerator;
a first memory device including a first instruction set configured to operate the accelerator and a second instruction set configured to operate the CPU;
a second memory device configured to receive a datafile, wherein the datafile includes a bitmap image file that is captured by the camera of the field of view, the bitmap image file including a plurality of bitmap images;
the accelerator being a multi-layer array configured to implement a convolution neural network (CNN) according to the first instruction set, the accelerator including a plurality of processing engines (PEs) defined according to PE instructions included within the first instruction set, each of the PEs being configured to implement one of a plurality of operators, the operator associated with each of the PEs being fixed insofar as each PE being incapable of performing any other one of the operators;
wherein the instruction scheduler is configured to selectively implement one or more of the operators in the accelerator by either one of activating and inactivating the PEs associated therewith;
wherein the CPU employs the plurality of operators implemented in the accelerator to extract a feature from the bitmap image file;
wherein the CPU communicates the feature to a second controller;
wherein the first memory device includes a third instruction set configured to operate the scheduler, the third instruction set defining a plurality of layers of the CNN configured to analyze the datafile, the third instruction set instructing the scheduler to one of activate and deactivate each of the PEs applicable to each layer such that the PEs are activated and deactivated as needed on a per-layer basis;
wherein the third instruction set defines a kernel size for each of the layers, and wherein the scheduler is configured to activate and deactivate each PE according to the kernel size associated therewith;

wherein the datafile is comprised of a plurality of bitmap images and each layer is configured to analyze a plurality of tiles selected from the bitmap images; and wherein the scheduler is configured to activate and deactivate each PE on a per-layer basis according to a data size of each tile.

14. The signal processing system of claim 13, wherein the signal processing system is in communication with a control system that is disposed to execute a control action, and, wherein the control system is disposed to execute the control action based upon the feature that is extracted from the bitmap image file.

15. The signal processing system of claim 13 wherein the scheduler is configured to activate at least two PEs for each of the tiles having the data size associated therewith greater than the kernel size of the corresponding layer.

16. A vehicle control system, comprising:
a camera disposed to capture a field of view proximate thereto;
a control system configured to control operation of an actuator of the vehicle;
a signal processing system including a controller, an accelerator and a memory device, wherein the accelerator is configured as a multi-layer array operable to implement a convolution neural network (CNN), the CNN having a plurality of layers configured to implement a plurality of processing engines (PEs), each of the PEs being assigned to one or more the layers and configured to execute one of a plurality of operators, the operator associated with each of the PEs being fixed insofar as each PE being incapable of performing any other one of the operators;
the signal processing system in communication with the camera and the control system, the controller including an instruction set,
the controller operable to:
i) capture, via the camera, an image of the field of view, wherein the image is composed of a bitmap image file;
ii) communicate the bitmap image file to the memory device;
iii) implement, in the accelerator, the CNN to perform image recognition according to processing of the bitmap image file via the operators associated with each of the PEs assigned to each layer;
iv) execute, via the controller, the CNN to extract a feature from the bitmap image file, wherein the feature includes an obstruction disposed in the field of view, the CNN selectively implementing the operators by correspondingly activating the PEs assigned to each layer and deactivating the PEs unassigned to each layer;
v) control, via the control system, operation of the actuator of the vehicle based upon the feature extracted from the bitmap image file;
wherein the PEs applicable to each layer are selectively activated and deactivated such that the PEs are activated and deactivated as needed on a per-layer basis;
wherein a kernel size is defined for each of the layers, and wherein each PE is activated and deactivated on a per-layer basis according to the kernel size associated therewith;
wherein each layer is configured to analyze a plurality of tiles selected from the bitmap image file; and
wherein each PE is activated and deactivated on a per-layer basis according to a data size of each tile.

17. The vehicle control system of claim 16, wherein the bitmap image file is of the field of view that is captured by the camera.

18. The vehicle control system of claim 16, wherein the plurality of operators comprises a composable rectified linear (ReLU) operator that is implemented by one of the PEs.

19. The vehicle control system of claim 16, wherein the plurality of operators comprises a composable pooling operator that is implemented by one of the PEs.

* * * * *